Patented May 25, 1926.

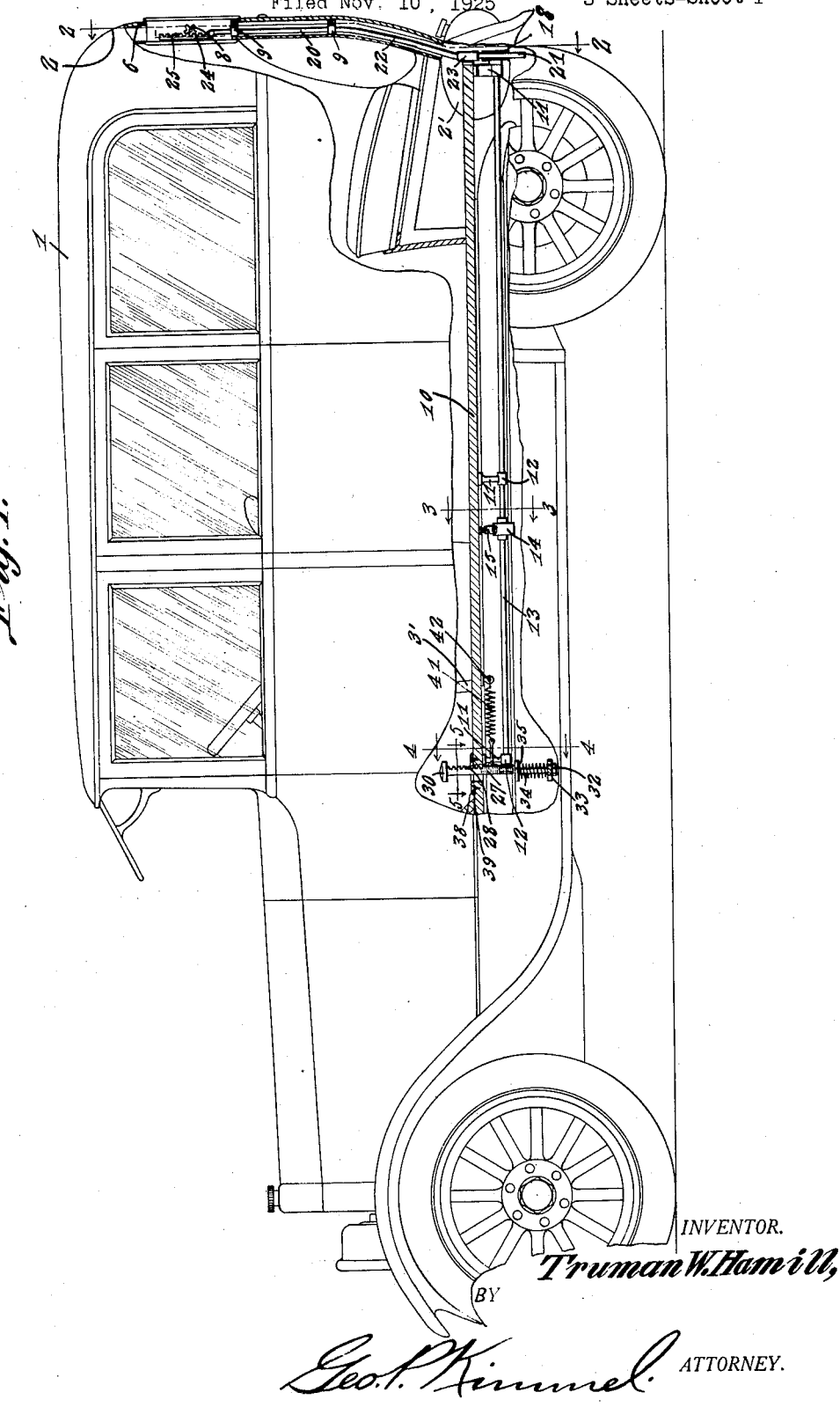

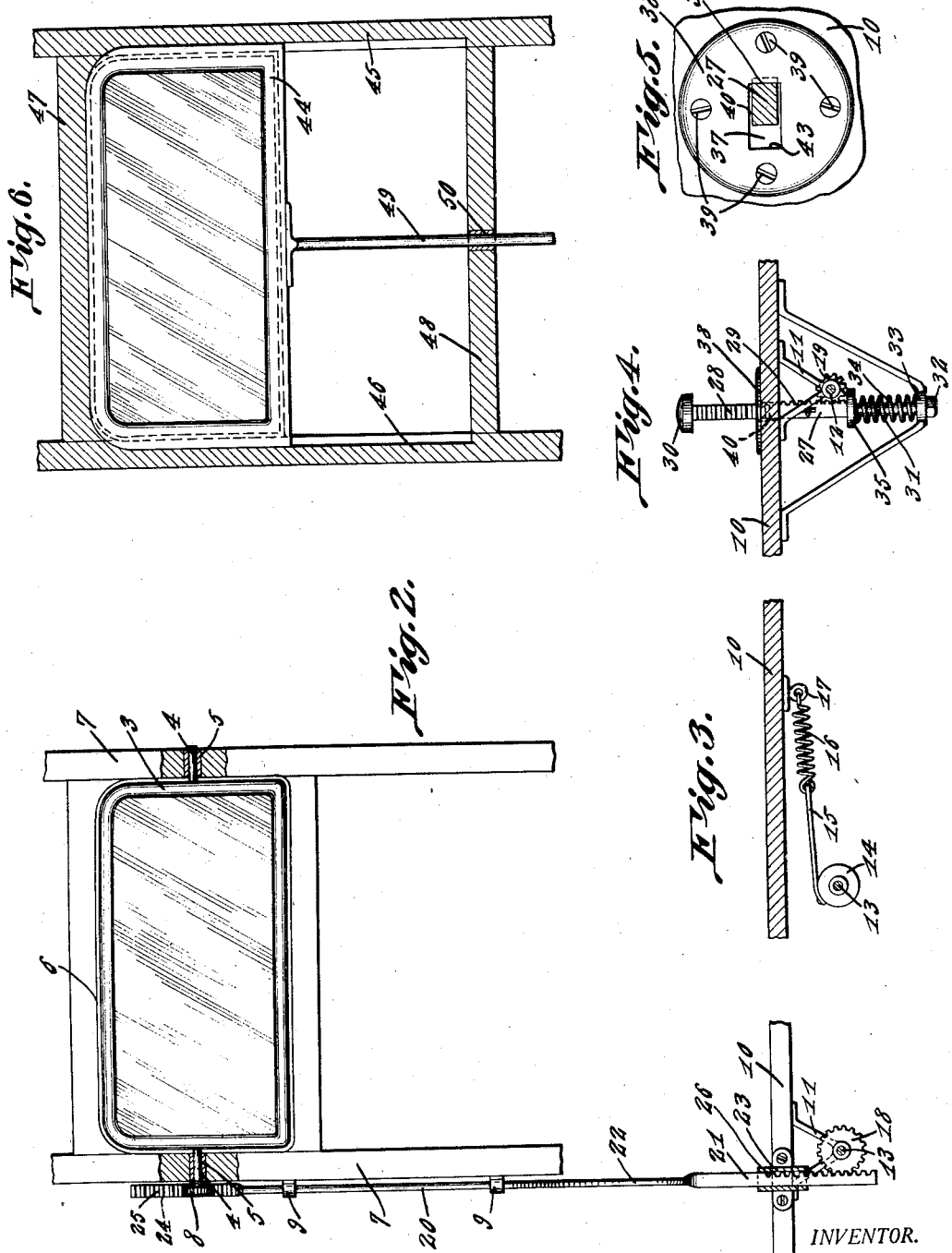

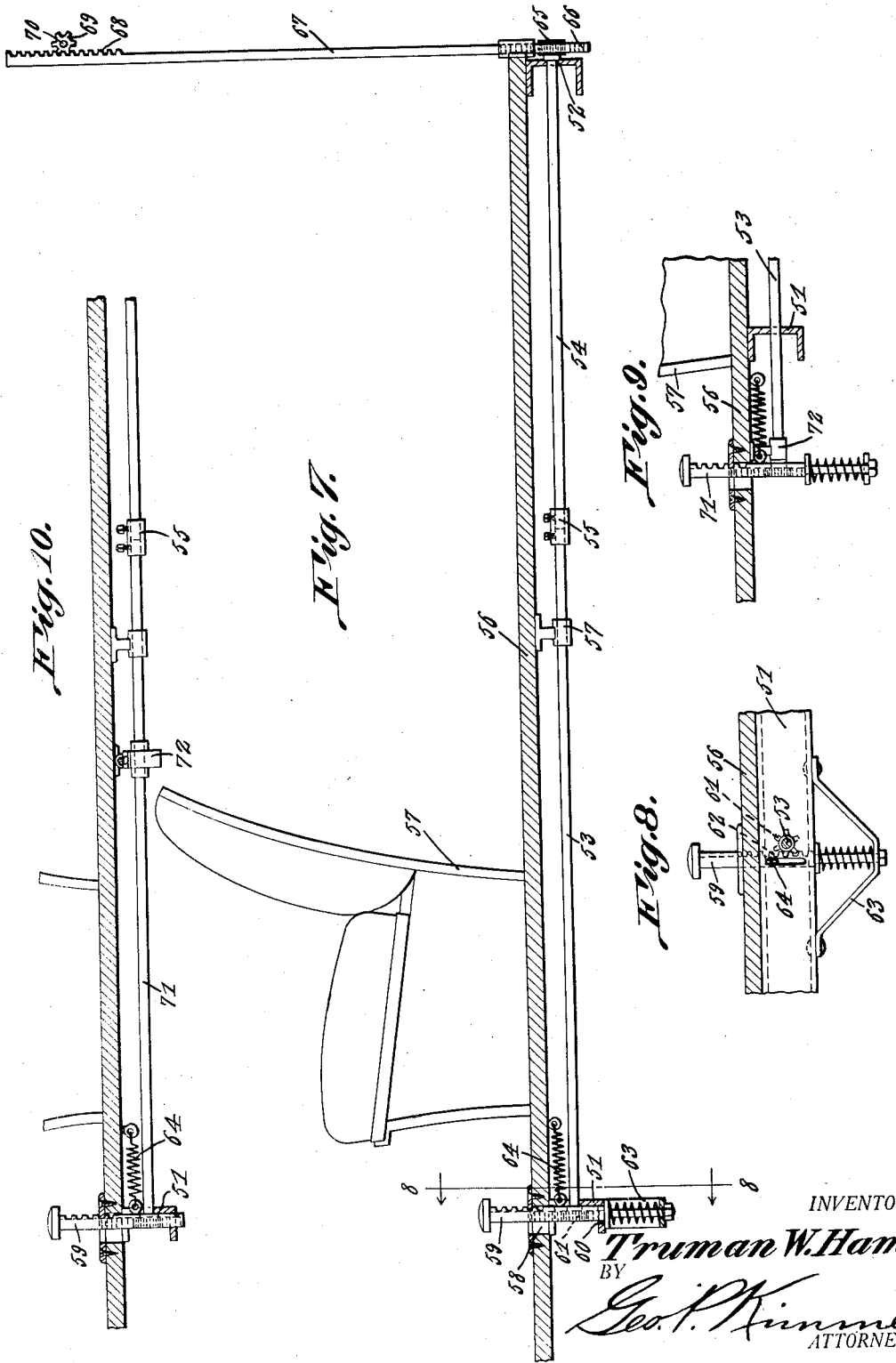

1,586,427

UNITED STATES PATENT OFFICE.

TRUMAN W. HAMILL, OF SILVERTON, OREGON.

WINDOW OPENING AND CLOSING MECHANISM.

Application filed November 10, 1925. Serial No. 68,091.

This invention relates to a window opening and closing mechanism, designed primarily for use in connection with motor vehicles, but it is to be understood that a window opening and closing mechanism, in accordance with this invention, can be employed for any purposes for which it is found applicable, and the invention has for its object to provide, in a manner as hereinafter set forth, a mechanism of the class referred to, under the control of the driver of the motor vehicle for opening and closing the rear window of the car when desired.

A further object of the invention is to provide, in a manner as hereinafter set forth, a mechanism of the class referred to, for opening to the desired extent the rear window of an automobile and with such opening movement under the control of the driver of the vehicle.

Further objects of the invention are to provide, in a manner as hereinafter set forth, a window opening and closing mechanism, which is simple in its construction and arrangement, strong, durable, thoroughly efficient in its use, readily installed with respect to an automobile body, and comparatively inexpensive.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a sectional elevation, looking towards one side thereof, of a motor vehicle provided with a rear window and showing the adaptation with the vehicle body of a rear window opening and closing mechanism, in accordance with this invention.

Figure 2 is a section on line 2—2, Figure 1.

Figure 3 is a section on line 3—3, Figure 1.

Figure 4 is a section on line 4—4, Figure 1.

Figure 5 is a section on line 5—5, Figure 1.

Figure 6 illustrates a modified form of rear window and an opening and closing element therefor.

Figure 7 is a side elevation of still another modified form.

Figure 8 is a section on line 8—8, Figure 7.

Figure 9 is a fragmentary view, in side elevation, of still another modified form.

Figure 10 is a fragmentary view, in side elevation of still another modified form.

Referring to the drawings in detail, 1 denotes the body of a motor vehicle, having the back 2 thereof formed with a rear member 3, carrying pintles 4, journalled in bearings 5, mounted in the back 2. By the foregoing arrangement, the back of the vehicle is provided with a pivoted rear window for opening and closing an opening 6 formed in the back 2. The back 2 includes a pair of vertical supports 7, in which the bearings 5 are mounted and between which is positioned the rear window 3. One of the pintles 4 is of greater length than the other, projects from one of the supports 7 and is provided on its outer end with a pinion 8. That support 7 from which a pintle 4 projects is provided with a pair of combined keepers and guide members 9 arranged in alignment with respect to the pinion 8.

Depending from the bottom or floor 10 of the body portion 1 is a series of spaced hangers 11, each provided at its lower end with a bearing 12, and extending through said bearings 12 as well as disposed lengthwise with respect to the body 1 is a spring controlled operating shaft 13, which has fixed thereto a pulley 14 adapted to have a flexible pulling member 15 wind on and off the same, and said pulling member 15 is connected at one end to a controlling spring 16, the latter having its other end fixed to a keeper 17 depending from the bottom 10. The rear end of the shaft 13 is provided with a small gear 18 and its forward end with a pinion 19.

Arranged at the rear of the body 1 is an operating member for opening and closing the window 3, and said member is constructed from a bar of substantial length bent to form an upstanding upper and lower portion 20 and 21 and an intermediate portion 22, which is disposed at right angles with respect to the lower end of the portion 20 and upper end of the portion 21. The intermediate portion 22 extends rearwardly from the upper end of the lower portion 21.

The upper portion 20 is slidably mounted in the keepers 9 and the lower portion 21 slidably extends through a combined guide and keeper 23, which is secured to the bottom 10. The upper terminal part of the upper portion 20 of the operating member is offset, as at 24, and has one face thereof toothed throughout, as at 25, and which engages with the pinion 8 for the purpose of shifting the window 3 to opened and closed positions. The upper terminal part 24 of the operating member is flat. The lower portion 21 of the operating member is flat and is provided with teeth 26 engaged by the gear 18 for the purpose of elevating and lowering the operating member to open and close the window 3.

Extending through the bottom 10 and under the control of the driver of the vehicle is an actuating means for revolving the shaft 13 against the action of the spring 16. Said actuating means is spring controlled and includes a vertically extending plunger 27 provided at the upper portion of one of its sides with teeth 28 and on the lower portion of another of its sides with teeth 29. The upper end of the plunger 27 is formed with a head 30. That part of the plunger 27, which is provided with the teeth 28 and 29 is polygonal in contour and the remaining portion thereof is cylindrical, as at 31, and the said remaining portion 31 provides the lower terminal portion of the plunger 27. The lower end of the plunger 27 carries a retaining nut 32, which abuts against the lower end of a V-shaped bracket 33. The lower terminal portion 31 of the plunger 27 extends through the bottom of the bracket 33, and said plunger 27 is capable of being moved downwardly by the foot of the driver of the vehicle against the action of a controlling spring 34, which is interposed between the upper face of the bracket 33 and a collar 35 carried by the plunger 27. The spring 34 is mounted on the reduced terminal portion 31 of the plunger 27. The teeth 29 engage with the pinion 19 for the purpose of revolving it, thereby causing the operation of the shaft 13. The teeth 28 are adapted to be engaged by the end wall 36 of a rectangular slot 37, formed in a wear plate 38, which is secured by hold-fast devices 39 to the upper face of the bottom 10. The opening 37 registers with an opening 40 formed in the bottom 10.

The plunger 27 is normally maintained against the wall 36 of the opening 37 through the medium of a pulling or controlling spring 41, which is secured at one end to the plunger 27, above the collar 35 and at its other end to a keeper 42 which depends from the bottom 10. The plunger 27 can be vertically shifted through the bracket 33 and is so mounted that it can be further shifted towards the other end wall 43 of the slot 37, so that the teeth 28 will be shifted clear of the end wall 36. The teeth 28, in connection with the end wall 36 and spring 41 coact to maintain the plunger 27 to the position to which it has been shifted and against the action of the spring 34. By this arrangement the window 3 can be shifted to any desired open position and detachably maintained in such position.

When the plunger 27 is depressed, the shaft 13 is operated, whereby the operating member will be moved upwardly, causing the teeth 25 to revolve the pinion 8 in a clockwise direction and open the window 3. When the pressure is removed from the plunger 27 and the latter disconnected from the end wall 36, the springs 16 and 31 will restore the shaft 13 and plunger 27 to normal position whereby the operating member will be lowered and the window 3 closed.

The lower portion 21 of the operating member is positioned at one end of the gasoline tank 2' and the intermediate portion 22 of said member is slightly curved to provide for the curvature of the back 2. The shift of the operating member to open the back window is of small extent to prevent the point of joinder of the portions 21 and 22 abutting against any part of the vehicle body.

The actuating member or spring controlled foot operated plunger is positioned forwardly of the front seat 3' of the vehicle and directly under the driver's heel and on the steering wheel side of the car.

The shaft 13 is extended rearwardly so that its rear end will come as near as possible under the back window to reduce the curvature of the portion 22 of the operating member.

In the form shown in Figure 6, the rear window 44 is of the sliding type and arranged to slide within the supports 45, 46, which are connected together by brace members 47, 48, and connected to the bottom of the window 44 is an operating member 49, which slidably extends through a bearing sleeve 50 formed in the brace member 48. When the sliding window 44 is employed the toothed offset portion 25 of the operating member is dispensed with and the upper end of the latter is directly connected to the bottom rail of the window 44, and by this arrangement the window 44 is vertically moved when the plunger 27 and shaft 13 are operated.

In the form shown in Figures 7 and 8, the actuating member or spring controlled foot operated plunger as well as the spring controlled operating shaft, is supported by the cross bars 51 of the chassis frame, and each of said bars is formed with an opening 52 for the passage of the operating shaft which is formed of two sections 53, 54, detachably connected together by a coupling member 55.

By forming the operating shaft with a pair of sections permits of the same to be conveniently mounted in position below the bottom 56 of the car body. A bearing bracket 57 depends from the bottom 56 and is employed for one of the shaft sections. The front seat of the vehicle is indicated at 57 and arranged forwardly thereof is an opening 58 for the passage of the actuating member or spring controlled foot operated plunger 59, which is arranged in a position to be engaged by the heel of the driver. The forward cross bar 51 has its bottom provided with an opening 60 for the passage of the plunger 59. The shaft section 53 extends into the forward cross bar 51 and carries a pinion 61 for engagement with the teeth 62 of the plunger 59. The controlling spring for the plunger 59 is indicated at 63 and its pulling spring at 64. The shaft section 54 projects rearwardly from the rear cross bar 52 and carries a pinion 65 for engagement with the teeth 66 on the lower portion of the shutter operating member 67, which has its upper portion toothed, as at 68, for engagement with the pinion 69 on the pintle 70 which projects from the pivoted rear window. The construction aforesaid operates in the same manner as that disclosed in Figure 1.

In the form shown in Figure 9, the actuating member or spring controlled foot operated plunger referred to by the reference character 71 is not supported by the forward cross bar 51, but is arranged forwardly thereof and supported in the same manner as illustrated in Figure 4. In the form shown in Figure 9, the forward section 53 of the operating shaft extends a substantial distance forwardly with respect to the forward cross bar 51 and is mounted in a depending bearing bracket 72 carried by the bottom 56.

In the form shown in Figure 10, the construction is the same as that shown in Figure 7, with the exception that the controlling spring surrounding the plunger 59 is dispensed with and the return of the plunger 59 is had through the medium of the operating shaft 71, having its return movement controlled by a controlling device 72 constructed and set up in the manner as that referred to in connection with the form shown in Figure 1 and consisting of a pulley, a flexible pulling member and a controlling spring, which are indicated at 14, 15 and 16 respectively, Figure 1. Otherwise than that as stated, the construction shown in Figure 10 is the same as that shown in Figure 7.

A rear window opening and closing mechanism, in accordance with this invention, is adapted to be used in connection with any type of closed car, particularly closed bodies having a straight back, but if the back is slightly curved the operating member for the rear window can be curved accordingly.

It is thought the many advantages of a window opening and closing mechanism for the purpose set forth can be readily understood, and although the preferred embodiment of the invention is as illustrated and described, yet it is to be understood that changes in the details of construction can be had which will fall within the scope of the invention as claimed.

What I claim is:—

1. A mechanism for opening and closing the rear window of a motor vehicle comprising the combination with a window shiftably mounted at the rear of an automobile, of a vertically movable operating member for shifting the window to opened and closed position, a spring controlled operating shaft operatively connected at its rear end with said member for elevating and lowering it, a vertically movable spring controlled plunger operatively connected with said shaft at its forward end for actuating it, and means for detachably securing said plunger in set position.

2. A mechanism for opening and closing the rear window of a motor vehicle comprising the combination with a window shiftably mounted at the rear of an automobile, of a vertically movable operating member for shifting the window to opened and closed position, an operating shaft, a rack and gear connection between the rear end of said shaft and the lower end of said member for vertically shifting the latter when the shaft is actuated, a vertically movable, spring controlled foot operated plunger, a pinion and rack connection between said plunger and the forward end of shaft for actuating the latter during the vertical movement of the plunger.

3. A mechanism for opening and closing the rear window of a motor vehicle comprising a vertically movable operating member for shifting the window to opened and closed position, an operating shaft, a rack and gear connection between said shaft and said member for vertically shifting the latter when the shaft is actuated, a vertically movable, spring controlled foot operated plunger, a pinion and rack connection between said plunger and shaft for actuating the latter during the vertical movement of the plunger, a spring controlled winding element connected to and associated with said shaft, and means for detachably securing the plunger in set position against the action of its controlling spring.

4. A mechanism for opening and closing the rear window of a motor vehicle comprising a vertically movable operating member for shifting the window to opened and closed position, an operating shaft, a rack and gear connection between said shaft and said member for vertically shifting the latter when the shaft is actuated, a vertically movable, spring controlled foot operated plunger, a pinion and rack connection between said plunger and shaft for actuating the latter during the vertical movement of the plunger, a plurality of combined guides and keepers for said member and adapted to be carried at the back of the vehicle, a guide for said member adapted to be carried by the bottom of the vehicle, and a plurality of hangers for said shaft adapted to be suspended from the bottom of the vehicle.

5. A mechanism for opening and closing the rear window of a motor vehicle comprising a vertically movable operating member for shifting the window to opened and closed position, an operating shaft, a rack and gear connection between said shaft and said member for vertically shifting the latter when the shaft is actuated, a vertically movable, spring controlled foot operated plunger, a pinion and rack connection between said plunger and shaft for actuating the latter during the vertical movement of the plunger, a plurality of combined guides and keepers for said member and adapted to be carried at the back of the vehicle, a guide for said member adapted to be carried by the bottom of the vehicle, a plurality of hangers for said shaft adapted to be suspended from the bottom of the vehicle, and a supporting bracket for said plunger adapted to be supported from the bottom of the vehicle.

6. The combination with a motor vehicle provided with a shiftably mounted rear window, of means arranged at the back of the vehicle and depending below the bottom thereof for opening and closing said window, a spring controlled shaft suspended from the bottom of the vehicle, the lower end of said means and the rear end of said shaft having coacting elements for vertically moving said means when the shaft is revolved, a foot pressed spring controlled vertically movable plunger extending through and supported from the bottom of the vehicle and operatively connected with said shaft for revolving it in one direction.

7. The combination with a motor vehicle provided with a shiftably mounted rear window, of means arranged at the back of the vehicle and depending below the bottom thereof for opening and closing said window, a spring controlled shaft suspended from the bottom of the vehicle, said means at its lower end and said shaft at the rear thereof having coacting elements for vertically moving said means when the shaft is revolved, a foot pressed spring controlled vertically movable plunger arranged forwardly of said coacting elements and extending through and supported from the bottom of the vehicle and operatively connected with said shaft for revolving it in one direction, and means for detachably securing said plunger in set position.

In testimony whereof, I affix my signature hereto.

TRUMAN W. HAMILL.